United States Patent Office 3,481,894
Patented Dec. 2, 1969

3,481,894
PLASTISOLS COMPRISING POLYVINYL CHLORIDE, DIALLYL ORTHOPHTHALATE AND EPOXY COMPOUND
Daniel A. Lima, Westport, Conn., and James P. Hamilton, Pasadena, Md., assignors to FMC Corporation, New York, N.Y., a corporation of Delaware
No Drawing. Filed Sept. 27, 1966, Ser. No. 582,246
Int. Cl. C08g *39/10;* C08f *29/24*
U.S. Cl. 260—23.5                                       7 Claims

ABSTRACT OF THE DISCLOSURE

This application discloses poly(vinyl chloride) plastisol molding compositions capable of producing satisfactory thick molded sections comprising, by weight, 70–100 parts of poly(vinyl chloride) dispersion resin, 0–30 parts of poly(vinyl chloride) extender resin, 25–100 parts of diallyl orthophthalate per 100 parts of poly(vinyl chloride), 12–25 parts of epoxy plasticizer per 100 parts of poly(vinyl chloride), 0.1–1% of a free radical polymerization initiator based upon the weight of diallyl orthophthalate, and 0.1–5% of a surfactant based on the total weight of a poly(vinyl chloride) resin.

---

This invention relates to improved rigid poly(vinyl chloride) compositions prepared by using the plastisol technique, and more particularly to poly(vinyl chloride) compositions containing higher than usual amounts of epoxy plasticizer in combination with diallyl orthophthalate, which cure when heated to form rigid products.

Poly(vinyl chloride) resins are of two basic types; hot mix resins and dispersion or plastisol resins. Poly(vinyl chloride) hot mix resins are finely divided solids which can be blended with plasticizers by hot milling or dry blending to form a plastic mass or a finely divided solid which is suitable for molding under pressure and at elevated temperatures.

Poly(vinyl chloride) dispersion resins are nonporous, finely divided solids whose particle size is somewhat smaller than the hot mix resins. These dispersion resins are formulated into pastes and more fluid mixes, called plastisols. These are prepared by simply mixing the resin with a relatively large amount of plasticizer to form a liquid dispersion of resin and plasticizer which can be converted by appropriate heat treatment, called fusion in the trade, to a resin plasticizer solution which is solid at ambient temperatures.

Plastisols have been extensively used because the fluid consistency of the composition before fusion renders them suitable for rotational and slush moldings, spray, dip, curtain and spread coatings, film and mold castings and foaming.

Plastisols have been made from which rigid vinyl products can be produced. Such plastisols are herein referred to as "rigid plastisols."

So called rigid, actually semi-rigid, plastisols have been prepared by adding a reduced amount of low viscosity plasticizer to the dispersion resin and further reducing the viscosity of the plastisol by replacing some dispersion grade resin by a poly(vinyl chloride) "extender" resin and a viscosity depressant such as a surfactant. An extender resin, also referred to in the trade as a blending resin, is a special grade of dispersion resin of generally higher particle size, which modifies the viscosity properties of plastisols; most poly(vinyl chloride) resin manufacturers produce and sell these special resins. Numerous compositions employing various ratios of dispersion grade resins and extender resins together with careful selection of low viscosity, low solvating plasticizers have been formulated in attempts to reduce the amount of plasticizer in the plastisol and thereby prepare plastisols from which rigid poly(vinyl chloride) products can be produced; but in every case the products have been only semi-rigid.

In addition to being only semi-rigid cured plastisols containing extender resins have grainy or rough textured surfaces on all surfaces which are not cured in contact with a smooth surface or mold due to the large particle size of the extender resins. A grainy surface is objectionable in many applications and especially in dip coated products where a smooth or glassy surface is desired.

Compositions have been made which reduce the plasticizer level of coating dispersions by replacing part of the plasticizer with a polymerizable liquid, generally a reactive monomer, which is later polymerized with heat and a free radical catalyst. These polymerizable liquids perform as plasticizers during the mixing and storage of the compounds, but when heated during fusion polymerizable liquid is converted to polymer which no longer plasticizes or makes the finished product soft. A poly(vinyl chloride) coating, employing a polymerizable liquid is described in U.S. Patent No. 2,567,719 issued to Loritsch et al.; and U.S. Patent No. 2,618,621 issued to Burt, describes use of polyethylene glycol dimethacrylate as a polymerizable liquid in preparing rigid plastisols.

When this technique of replacing all or part of the plasticizer with a polymerizable liquid is applied to plastisol molding, to produce rigid items in conventional plastisol molding equipment, thick sections in the molded items develop voids and cracks. Although there has been much activity in rigid plastisol technology since "polymerizable plasticizers" were first tried no one has solved the problem of avoiding cracks and voids in thick sections in the molded items and only thin walled or coated products have been made. Numerous polymerizable liquids have been investigated and unusually precise fusion cycles and controls have been employed with no commercial success.

The principal object of this invention is to provide poly(vinyl chloride) plastisols using polymerizable liquids which can be molded in conventional equipment to provide rigid products with thick sections without developing flaws such as cracks and voids.

We have discovered that rigid poly(vinyl chloride) compositions can be made in thick sections from plastisols containing diallyl orthophthalate as the polymerizable liquid, if there is also incorporated in the plastisol an unusually large amount of an epoxy plasticizer, about 15–20 parts of epoxy plasticizer per 100 parts of total poly(vinyl chloride) resin by weight. These rigid heat curing poly(vinyl chloride) plastisols use a free radical catalyst with the allylic monomer, and preferably heat stabilizers of the type normally used to stabilize poly(vinyl chloride) resin compositions along with conventional amounts of surfactants which improve viscosity characteristics of the liquid plastisol, and if desired fillers and pigments.

We utilize about 15–20 parts of epoxy plasticizer per 100 parts of total poly(vinyl chloride) resin by weight. This is a much higher percentage of this type of material than is normally used in conventional formulations. However, despite the relatively high percentage of this type of plasticizer, the heat cured compositions are truly rigid.

Our new poly(vinyl chloride) plastisols are essentially based on poly(vinyl chloride) dispersion resin; but we may use up to half of the total vinyl resin in the form of extender resin, where smoothness of the molded pieces is not an essential characteristic.

We use 25–100 parts of diallyl orthophthalate based upon 100 parts by weight of the poly(vinyl chloride)

resin, and 0.1-5% of free radical polymerization initiator based upon the weight of the diallyl phthalate. For optimum results 0.1-5% of a surfactant which improves the viscosity characteristics of the liquid plastisol is used, together with an effective amount of a conventional heat stabilizer for the poly(vinyl chloride) resin. Omission of the surfactant requires the use of diallyl phthalate in the upper part of the range; omission of the heat stabilizer results in some discoloration on fusion, which is often not objectionable in darker colored filled or pigmented compositions. Filler and pigment can be used if desired; obviously, small percentages of conventional plasticizer can be used, if completely rigid products are not desired.

Quite surprisingly, the presence of the epoxy plasticizer in relatively large amounts makes possible the curing of these novel plastisols in conventional plastisol processing equipment in thick sections without developing flaws such as cracks and voids.

The novel plastisols of this invention are prepared from a mixture of vinyl dispersion resin and vinyl extender resin. Each of these resins is commercially available and is identified as to its type by the manufacturer. By "poly(vinyl chloride) dispersion resin" we mean a homopolymer or copolymer of vinyl chloride which is sufficiently nonporous and of sufficiently small particle size that it is capable of forming a plastisol with conventional primary plasticizers. Suitable copolymers are those containing a major amount of vinyl chloride copolymerized with relatively small amounts of another vinyl monomer such as vinylidene chloride, various dialkyl maleates including ethyl and butyl maleate, vinyl acetate, various dialkyl acrylates including ethyl and butyl acrylate, and many others.

Vinyl dispersion resins are prepared by emulsion polymerization of vinyl chloride in aqueous medium using a water soluble catalyst and an emulsifying agent as is well known to those skilled in the art. The resin is most commonly recovered by spray-drying. Vinyl dispersion resins are readily distinguished from other vinyl resins by their smaller particle size. The average particle size of a vinyl dispersion resin is generally in the range of about 0.1-5 microns, and more commonly in the range of about 0.5-2 microns.

The novel plastisols of this invention may also contain a vinyl extender resin which tends to lower the initial viscosity of the plastisol and, in combination with the polyethylene glycol monolaurate, stabilizes the viscosity at a low level. By "poly(vinyl chloride) extender resin" we mean a homopolymer or copolymer of vinyl chloride which is sufficiently nonporous that it reduces the viscosity of a vinyl plastisol when added thereto, but not of sufficiently small particle size that it can form a plastisol by itself with conventional primary plasticizers. Suitable copolymers are those containing a major amount of vinyl chloride copolymerized with relatively small amounts of another vinyl monomer such as vinylidene chloride, various dialkyl maleates including ethyl and butyl maleate, vinyl acetate, various dialkyl acrylates including ethyl and butyl acrylate, and many others.

Poly(vinyl chloride) extender resins may be prepared by emulsion or suspension polymerization of vinyl chloride. Suspension polymerization is generally carried out in aqueous medium using a monomer-soluble peroxide catalyst, a suspending agent, and a small amount of an emulsifying agent as is well known to those skilled in the art. Vinyl extender resins generally have an average dry particle size of about 50-170 mesh, and more commonly about 75-150 mesh.

Diallyl orthophthalate monomer is the preferred allylic monomer for use in preparing these novel plastisols, because it is an item of commerce and available at reasonable cost. The diallyl orthophthalate monomer is generally used at a level of 25 to 100 parts by weight, and preferably at about 35-45 parts by weight per 100 parts of resin.

The epoxy plasticizers generally useful in preparing the novel plastisols of this invention are well known, being prepared by the epoxidation of various materials such as unsaturated vegetable oils such as soybean oil, linseed oil, rape seed oil and the like; animal oils such as fish oils; unsaturated fatty acids, such as tall oil fatty acids; esters of unsaturated fatty acids, such as alkyl oleates; esters of other unsaturated acids, such as dioctyl hexahydrophthalic acid; and polymeric unsaturated materials, such as low molecular weight polybutadiene, and the like. The epoxy plasticizers are used in this invention at a level of about 12-25 parts by weight per 100 parts of resin, and preferably about 15-20 parts of epoxy is used per 100 parts of resin. The epoxy plasticizers containing a high oxirane oxygen level are preferred and epoxidized linseed oil containing 9.5% oxirane oxygen, available commercially as Epoxol 9-5, was found to be particularly useful.

Heat stabilizers of the type generally used to stabilize poly(vinyl chloride) resin compositions such as organic salts of barium, cadmium, zinc, tin, lead, calcium, etc., are useful in this invention. These stabilizers are used at the usual level of 1-3 parts by weight per 100 parts of poly(vinyl chloride) resin. Because of the temperatures reached in curing the polymerizable plasticizers in these novel plastisols the more effective stabilizers such as tin stabilizers are preferred and dibutyl tin dilaurate used at a level of 2 parts by weight per 100 parts of poly(vinyl chloride) resin was found to be particularly effective.

A free radical catalyst is used in these allylic monomer plastisols at the level of about 0.1-1% based on the weight of allylic monomer by weight to initiate, polymerization of the allylic monomer. We prefer to use a mixed catalyst system employing a catalyst which initiates the cure at a relatively low temperature, such as benzoyl peroxide, and a catalyst which is activated at a higher temperature such as di-tertiary-butyl peroxide to complete the polymerization of the monomer.

Pigments and fillers may be used in compounding these novel plastisols if desired. Pigments color the compounds and fillers, add opacity and reduce the overall cost of these plastisols without greatly reducing the physical properties of the fused or cured product. Organic and inorganic fillers and pigments may be used.

Surfactants, in small amounts, are useful as dispersing agents and viscosity stabilizers in compounding these novel plastisols. Typical anionic and nonionic surfactants are generally useful as viscosity depressants. Preferred viscosity stabilizers and dispersing agents are polyethylene glycol monolaurates and isooctyl phenoxy polyethoxy ethanols.

The resins, stabilizers, allylic monomers, catalysts and surfactants used in these plastisol compositions are well known in the trade and are extensively described in the technical data bulletins of the various suppliers of these materials.

The plastisols of this invention can be compounded in conventional equipment used to compound plastisols such as low speed, high shear dough mixers, pebble mills, two-roll mills and ink mills. The compounded plastisols can be cured in conventional plastisol molding equipment or in films and thick coatings in furnaces, ovens, or under infra-red heat sources. The curing cycles or fusion cycles of these plastisols are conventional. No particular care or control is required, as compared with formerly available materials, which required extremely careful control of the fusion cycle even to produce satisfactory thin sections.

Typical of the conventional cures of the compounds of this invention, a one-eighth inch thick sheet can be cured on a stainless steel sheet one-sixteenth inch thick in a forced draft oven at 350° F. in 15 minutes.

The following typical formulations are illustrative of this invention and are given by way of example and not by way of limitation.

EXAMPLE 1

| Parts by Weight: | A | B | C |
|---|---|---|---|
| Poly(vinyl chloride) resin (dispersion grade) | 70 | 70 | 70 |
| Poly(vinyl chloride) resin (extender grade) | 30 | 30 | 30 |
| Diallyl orthophthalate | 35 | 45 | 35 |
| Epoxidized linseed oil 9.5% oxirane oxygen | 15 | 15 | 20 |
| Dibutyl tin dilaurate | 2 | 2 | 2 |
| Benzoyl peroxide | 0.2 | 0.2 | 0.2 |
| Di-tertiarybutyl peroxide | 0.5 | 0.5 | 0.5 |
| Isooctyl phenoxy polyethoxy ethanol | 1.0 | 1.0 | 1.0 |
| Composition viscosity, centipoises at 70° F | 3,900 | 1,900 | 4,000 |

Each sample in this example was prepared by mixing the ingredients together. Samples A, B and C cured well in thick sections; ¼ inch sections curing on a ¹⁄₁₆ inch stainless steel plate in 15 minutes at a temperature of 350° F. The cured samples were sectioned and examined for voids, however, none of the samples contained void cracks or checks.

EXAMPLE 2

The following ingredients were mixed together:

| | Parts by wt. |
|---|---|
| Poly(vinyl chloride) (dispersion grade resin) | 100 |
| Diallyl phthalate monomer | 45 |
| Epoxidized linseed oil | 15 |
| Dibutyl tin dilaurate | 2.0 |
| Benzoyl peroxide | 0.2 |
| Di-tertiary butyl peroxide | 0.5 |
| Isooctyl phenoxy polyethoxy ethanol | 1.0 |

This composition had a viscosity of 6,000 centipoises. The sample cured well in 15 minutes at 350° F. and thick sections were found to cure well without voids.

EXAMPLE 3

The following ingredients were mixed together:

| | Parts by wt. |
|---|---|
| Poly(vinyl chloride) (dispersion grade resin) | 70 |
| Poly(vinyl chloride) (extender resin) | 30 |
| Diallyl phthalate monomer | 35 |
| Epoxidized soybean oil | 15 |
| Dibutyl tin dilaurate | 2 |
| Benzoyl peroxide | 0.2 |
| Di-tertiary butyl peroxide | 0.5 |
| Isooctyl phenoxy polyethoxy ethanol | 1.0 |

This composition had a viscosity of 3,900 centipoises. A ¼ inch thick sample cured well in 15 minutes at 350° F. without developing any cracks or voids.

It will be understood by those skilled in the art that many variations in the formulations of this invention may be developed without departing from the spirit and teachings of this invention.

We claim:

1. A poly(vinyl chloride) plastisol molding composition capable of producing satisfactory thick molded sections which comprises, by weight, 70–100 parts of poly(vinyl chloride) dispersion resin, having an average particle size of 0.1 to 5 microns, 0–30 parts of poly(vinyl chloride) extender resin, having an average particle size of 50–170 mesh, 25–100 parts of diallyl orthophthalate per 100 parts of poly(vinyl chloride), 12–25 parts of epoxy plasticizer per 100 parts of poly(vinyl chloride), 0.1–1% of free radical polymerization initiator based upon the weight of diallyl orthophthalate, and 0.1–5% of a surfactant based upon the total weight of the poly(vinyl chloride) resin.

2. The poly(vinyl chloride) plastisol composition of claim 1 in which the plastisol contains 15–20 parts of epoxy plasticizer.

3. The poly(vinyl chloride) plastisol composition of claim 1 in which the epoxy plasticizer is epoxidized linseed oil.

4. The poly(vinyl chloride) plastisol composition of claim 1 in which the epoxy plasticizer is epoxidized soybean oil.

5. The poly(vinyl chloride) plastisol composition of claim 1 in which the surfactant is isooctyl phenoxy polyethoxy ethanol.

6. The poly(vinyl chloride) plastisol composition of claim 1 in which the plastisol composition contains 1–3 parts of poly(vinyl chloride) heat stabilizer based on the total weight of poly(vinyl chloride) resin in the plastisol composition.

7. The poly(vinyl chloride) plastisol composition of claim 1 in which the plastisol contains 35–45 parts of diallyl orthophthalate.

References Cited

UNITED STATES PATENTS

| 2,567,719 | 9/1951 | Loritsch et al. | 260—31.8 |
| 3,066,110 | 11/1962 | Cornell | 260—30.4 |
| 3,275,713 | 9/1966 | Rubens et al. | 260—884 |
| 3,275,714 | 9/1966 | Thompson | 260—884 |
| 3,305,514 | 2/1967 | Tiffan et al. | 260—32.6 |
| 3,329,642 | 7/1967 | Lima et al. | 260—31.4 |

DONALD E. CZAJA, Primary Examiner

R. A. WHITE, Assistant Examiner

U.S. Cl. X.R.

260—23, 30.4, 45.75, 884